United States Patent Office 2,960,512
Patented Nov. 15, 1960

2,960,512

PROCESS FOR THE PREPARATION OF 8(14)-UNSATURATED-9-ALKOXY-11-HYDROXY STEROID COMPOUNDS

Eugene J. Agnello and Gerald D. Laubach, Jackson Heights, N.Y., assignors to Chas. Pfizer & Co., Inc., Brooklyn, N.Y., a corporation of Delaware No Drawing. Filed Aug. 1, 1955, Ser. No. 525,775

2 Claims. (Cl. 260—397.2)

This invention is concerned with novel steroid compounds useful as intermediates in the synthesis of biologically active materials, such as cortisone. In particular, it is concerned with certain 9-alkoxy-11-hydroxylated steroids and methods for their preparation.

The presence of a keto group at the 11-position of the nucleus is often essential for full biological activity of various cortical steroids, particularly cortisone and the like. The introduction of such a group proves difficult and has been the subject of considerable chemical research. In a copending patent application (Serial No. 416,938 filed on March 17, 1954 by Gerald D. Laubach et al. and now U.S. Patent 2,807,632), it has been shown that certain nuclear unsaturated 11,14-dihydroxy steroids can be rearranged in aqueous acidic media to form 9,11-dihydroxy compounds. In another copending application by Gerald D. Laubach (Serial No. 416,937 filed March 17, 1954, and now U.S. Patent 2,794,033) a method for the preparation of 8-unsaturated 11, 14-dihydroxylated steroids is taught.

It has now been found that contacting 8-nuclear unsaturated 11,14-dihydroxylated steroid compounds with weakly acidified alkanols results in the formation of 8(14)-unsaturated 9-alkoxy-11-hydroxy steroids. This yields products of value as cortisone analogues.

Various aliphatic alcohols or substituted alcohols are included in the term "alkanols" as employed herein. A number of such alkanols may be used in the process of this invention. The alkoxy group introduced at the 9-position of the nucleus depends on the alcohol used. Thus, if methanol is used, a methoxyl group is introduced during the rearrangement. Various aliphatic alcohols like methanol, ethanol, propanol, butanol, and generally saturated aliphatic alcohols having up to about six carbon atoms in their primary chains are especially valuable. Substituted aliphatic alcohols, such as benzyl alcohol, phenethyl alcohol and similar aliphatic chains having substituents of the benzene series, are also satisfactory. The medium should normally be anhydrous. Traces of moisture interfere with the reaction, so the mixture should be kept as dry as is practically possible. Therefore, care in selection of reagents and solvents should be observed. By weakly acidic conditions we mean that the alcoholic medium contains an appreciable amount (e.g. between about 0.1% and 20%) of a moderately strong organic acid, such as acetic acid, chloracetic acid, p-toluenesulfonic acid and so forth.

In general, the reaction of this invention should be conducted at about room temperature, although somewhat elevated temperatures, up to about 50° C., are not deleterious. The reaction generally requires at least several hours for completion. However, this depends to a certain extent upon the temperature at which the reaction is conducted, the alcohol used and the acid catalyst used.

The product may be recovered by conventional procedures. The alcohol may be removed, for instance, by evaporation and the residual acidic material may be washed from the product with water or with dilute, mildly alkaline solutions. If further purification of the product is required, it may be accomplished by methods such as chromatography.

According to a second embodiment of this invention, an 8(14)-unsaturated 9-alkoxy-11-hydroxy steroid, obtained by contacting an 8-unsaturated 11,14-dihydroxy steroid with alkanol, is acylated at the 11-position by means of acylating agents such as acetic anhydride, acetyl chloride, benzoyl chloride, propionyl chloride, succinic anhydride, and other similar acid halides and acid anhydrides, according to well known, standardized procedures. The resulting 8(14)-unsaturated 9-alkoxy-11-acyloxy materials are valuable as means for further purifying and isolating the 9-alkoxy-11-hydroxy steroid compounds and also as means of protecting the hydroxyl group during various reactions on other parts of the molecule.

Various substituents may be present in the compounds used as starting materials for our reactions at positions other than the 11 and 14 carbons. Thus, the 3-position of the nucleus may be substituted by an hydroxyl or a group readily hydrolyzable to an hydroxyl (e.g. acetates, propionates, butyrates and like esters; methyl, ethyl, isopropyl, benzyl and similar ethers). Furthermore, the 17-position of the steroid nucleus may be substituted by a variety of groups without in any way interfering with the course of the rearrangement reaction. Groups which may be substituted at this position of the nucleus include

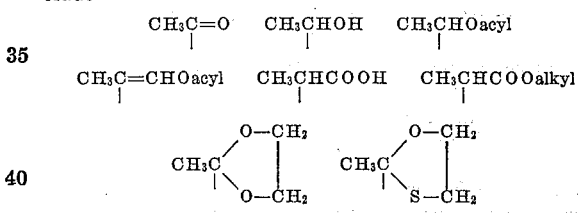

and groups attached at two points of the D ring such as

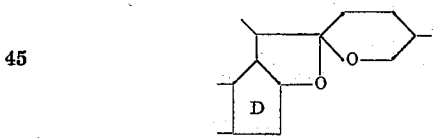

Especially useful are the compounds having at the 17-position the side chain

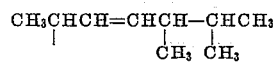

This is the unsaturated $C_9H_{17}$ side chain found in ergosterol. Compounds having this side chain are referred to as compounds of the 22-ergostene series.

The reactions of this invention may be illustrated by the following diagram in which, by way of example, ergosta-6,8,22-triene-3,11,14-triol 3-acetate is used as starting material. In the first reaction, rearrangement is accomplished in the presence of methanol ($CH_3OH$) and under mildly acidic conditions (H+). The product formed by the rearrangement is ergosta-6,8(14),22-triene-9-methoxy-3,11-diol 3-acetate. Acetylation of this results in the formation of ergosta-6,8(14),22-triene-9-methoxy-3,11-diol diacetate. As pointed out above, other equivalent acylating agents may obviously be used in place of acetic anhydride. Thus, the use of benzoyl chloride would result in the formation of the 11-benzoate.

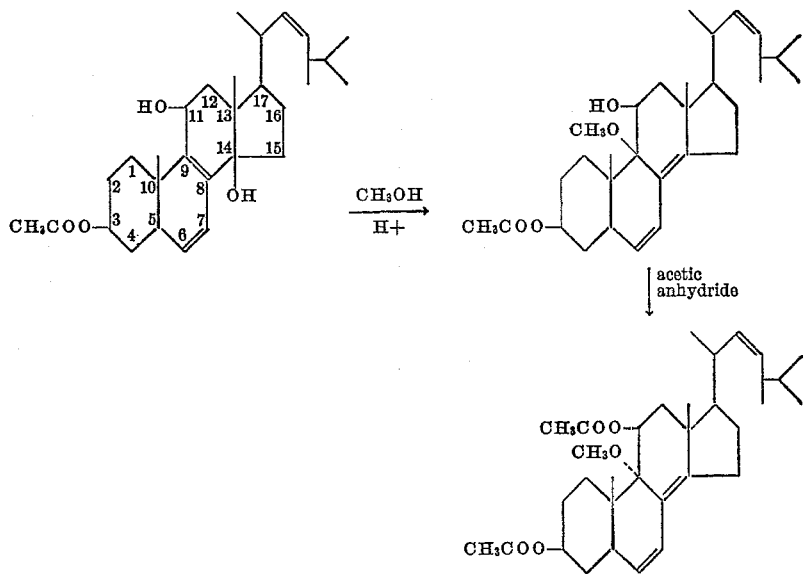

This invention includes within its scope not only the processes described above, but also the products thereof, which have not been described before and which are useful cortisone intermediates. The first of this series is 8(14)-unsaturated-9-alkoxy-11-hydroxy steroid compounds of the 22-ergostene series, among which the 6,8(14)-unsaturated-9-alkoxy-11-hydroxy steroids of the 22-ergostene series are a noteworthy species. These compounds bear, at the 3-position of the nucleus, an hydroxyl group or a group readily hydrolyzable to an hydroxyl, as previously described, and at the 17-position of the nucleus the unsaturated $C_9H_{17}$ side chain. The second group of compounds in this series of new materials are 6,8(14)- and broadly the 8(14)-unsaturated-9-alkoxy-11-acyloxy steroid compounds of the 22-ergostene series which may be likewise substituted variously at the 3-position of the nucleus. It is obvious that, if a 3-hydroxylated compound is used for the acylation reaction, both the 3- and 11-hydroxyl will be acylated. To describe both types of the new 11-oxygenated products, i.e. the 11-hydroxy and 11-acyloxy steroids, the term "11-hydroxylated" is hereinafter employed.

The following outline, using a typical compound of this invention, is illustrative of the manner in which the novel compounds of the present invention are utilized for the production of cortisone. The other compounds of this invention are converted to cortisone by obvious adaptations of this procedure. For example, the compound $\Delta^{6,8(14),22}$-ergostatriene-9α-methoxy-3β,11α-diol 3-acetate (prepared in Example I below) is oxidized by the standard method employing $CrO_3$ in acetic acid to give $\Delta^{6,8(14),22}$-ergostatriene-9α-methoxy-3β-ol-11-one 3-acetate which is then demethoxylated with hydrogen chloride in acetic acid to give $\Delta^{6,8,14,22}$-ergostatetraene-3β-ol-11-one 3-acetate. (This demethoxylation is also accomplished by treatment with $POCl_3$ in pyridine.) This compound is then hydrogenated catalytically, using Raney nickel in the presence of alkali (as disclosed in copending application Serial Number 317,576 filed October 29, 1952 and now U.S. Patent 2,740,797) to give $\Delta^{8,22}$-ergostadiene-3β-ol-11-one 3-acetate. Finally, the 8-position double bond of this compound is selectively reduced by the standard method employing lithium in liquid ammonia to give the compound $\Delta^{22}$-ergostene-3β-ol-11-one 3-acetate, a well recognized intermediate for the production of cortisone.

The following examples are given solely for the purpose of illustration and are not to be construed as limitations of this invention, many variations of which are possible without departing from the spirit or scope thereof.

EXAMPLE I $\Delta^{6,8(14),22}$-ergostatriene-9α-methoxy-3β,11α-diol 3-acetate To 110 milliliters of methanol, freshly distilled from magnesium methylate and containing 5 grams of anhydrous sodium sulfate, to assure anhydrous conditions throughout the reaction, was added 1.1 grams of ergosta-6,8,22-triene-3,11,14-triol 3-acetate and 0.1 gram of chloracetic acid. The mixture was stirred for 20 hours in a flask protected from atmospheric moisture. The mixture was then filtered and the solvent was removed from the filtrate in vacuo. A white solid was obtained which was washed several times with water and then dried. It weighed 1.1 grams and melted at 128° C. The product was recrystallized twice from 90% methanol and a yield of 0.70 gram (62%) of highly purified material was obtained. This consisted of clusters of flat, white needles melting at 123.4°–125° C. The optical rotation of this product was $[\alpha]_D^{25} = -25.9°$ (in chloroform). A sample recrystallized for analysis had a melting point of 137.4–138.4° C. This product had an ultraviolet absorption maximum at 248 mμ (log ε=4.56).

Analysis—Calcd. for $C_{31}H_{48}O_4$: C, 76.81; H, 9.98. Found: C, 76.91; H, 9.86.

This product exhibited two melting points. Recrystallization of part of the analytical sample referred to above gave a sample with identical rotation but melting at 123°–124.4° C.

EXAMPLE II $\Delta^{6,8(14),22}$-ergostatriene-9α-methoxy-3β,11α-diol-3,11-diacetate The product obtained according to Example I was acetylated in a mixture of pyridine and acetic anhydride. The reaction product was obtained as a thick oil which was purified by chromatography. The infrared spectrum of the product showed the absence of any free hydroxyl group.

This present application is a continuation-in-part of application Serial Number 313,798 filed October 8, 1952 and now abandoned.

What is claimed is:

1. A process for the preparation of an 8(14)-unsaturated-9-alkoxy-11-hydroxy steroid compound, which comprises contacting an 8-unsaturated 11,14-dihydroxy steroid of the 22-ergostene series with a weakly acidified alkanol at a temperature up to about 50° C.

2. A process for the preparation of a 6,8(14)-unsaturated-9-alkoxy-11-hydroxy steroid compound, which comprises contacting an 11,14 - dihydroxy - 6,8 - unsaturated steroid of the 22-ergostene series with a weakly acidified alkanol at a temperature up to about 50° C.

References Cited in the file of this patent

UNITED STATES PATENTS 2,854,452   Laubach _____ Sept. 30, 1958

OTHER REFERENCES

D.N.R. Barton et al.: J. Chem, Soc., 1954, pages 52–63.
D.N.R. Barton et al.: J. Chem. Soc., 1954, pages 3045–3051.